United States Patent [19]

Roeling

[11] Patent Number: 5,542,815
[45] Date of Patent: Aug. 6, 1996

[54] METHOD OF USING A COUPLING SYSTEM FOR MOTORIZED VEHICLES

[76] Inventor: James E. Roeling, 1924 Thomas St., Beloit, Wis. 53511

[21] Appl. No.: 370,308

[22] Filed: Jan. 9, 1995

Related U.S. Application Data

[62] Division of Ser. No. 79,460, Jun. 18, 1993, Pat. No. 5,387,070.

[51] Int. Cl.$^6$ ................................. B60P 7/06; B60P 1/28
[52] U.S. Cl. .................................. 414/786; 410/3
[58] Field of Search ..................... 414/471, 477, 414/482, 483, 484, 485, 401, 584, 786; 410/2–4, 9–11, 19, 30; 280/508, 509

[56] References Cited

U.S. PATENT DOCUMENTS

| | | | |
|---|---|---|---|
| 1,835,840 | 12/1931 | Barclay . | |
| 3,672,523 | 6/1972 | Albert | 410/3 |
| 3,730,552 | 5/1973 | Clark | 280/179 |
| 3,786,950 | 1/1974 | Zemien | 414/483 |
| 4,083,594 | 4/1978 | Tullock | 296/1 |
| 4,168,932 | 9/1979 | Clark | 414/483 |
| 4,475,762 | 10/1984 | DeLong et al. | 296/65 |
| 5,005,846 | 4/1991 | Taylor | 280/30 |
| 5,044,845 | 9/1991 | Baker, Jr. | 410/3 |
| 5,203,655 | 4/1993 | Persau | 410/30 |

FOREIGN PATENT DOCUMENTS

| | | |
|---|---|---|
| 2642378 | 8/1990 | France . |
| 984908A | 1/1983 | U.S.S.R. . |

*Primary Examiner*—Karen B. Merritt
*Assistant Examiner*—Stephen Gordon
*Attorney, Agent, or Firm*—M. Paul Hendrickson

[57] ABSTRACT

The present invention provides a method of using a coupling device which, when mounted to a transport, serves to catch and immobilize a moving vehicle equipped with a coupling unit. The coupling device may be mounted onto a snowmobile trailer and includes a coupling system which effectively couples onto a snowmobile ski eyelet when the ski enters a coupling zone. The device includes appropriate mounts for mounting the device to the snowmobile trailer bed and a ski impacting plate which, when struck by the ski, causes a coupling pin retainer to move sufficiently to release the coupling pin. The released coupling pin couples to the eyelet and stops the snowmobile from further movement.

18 Claims, 5 Drawing Sheets

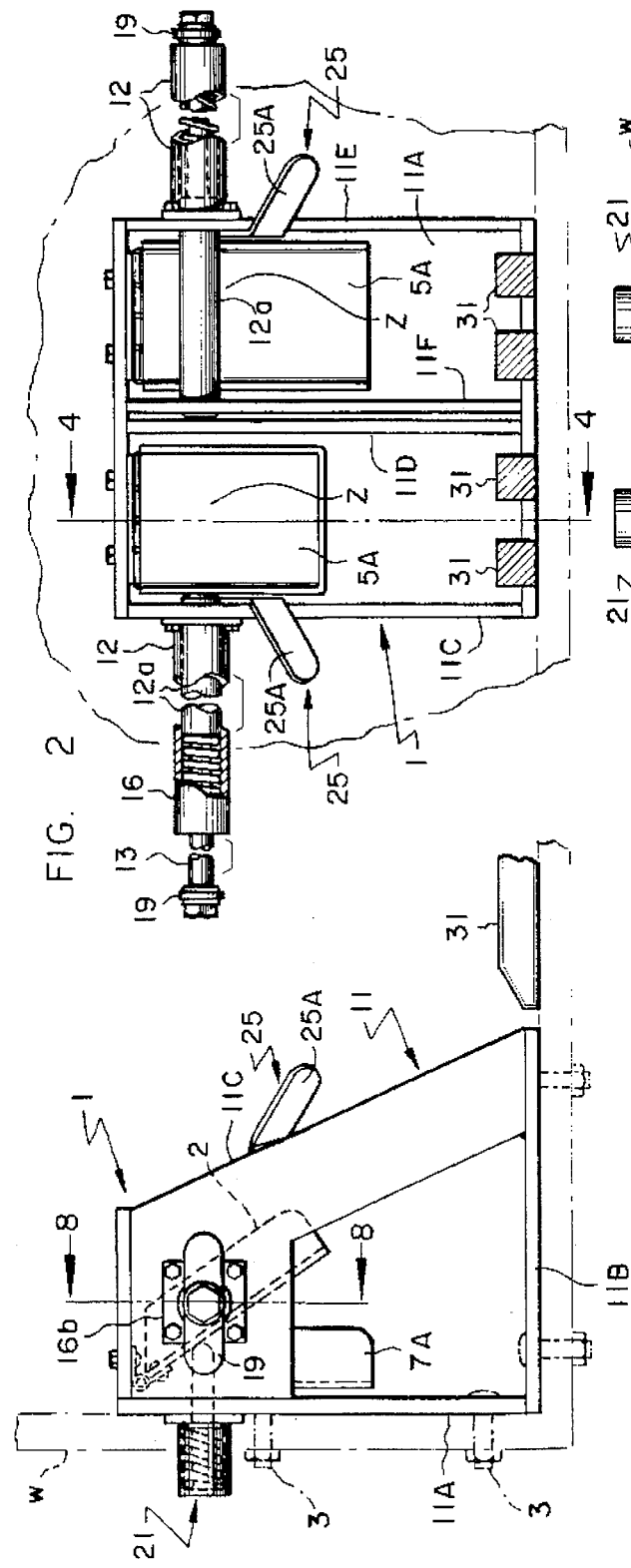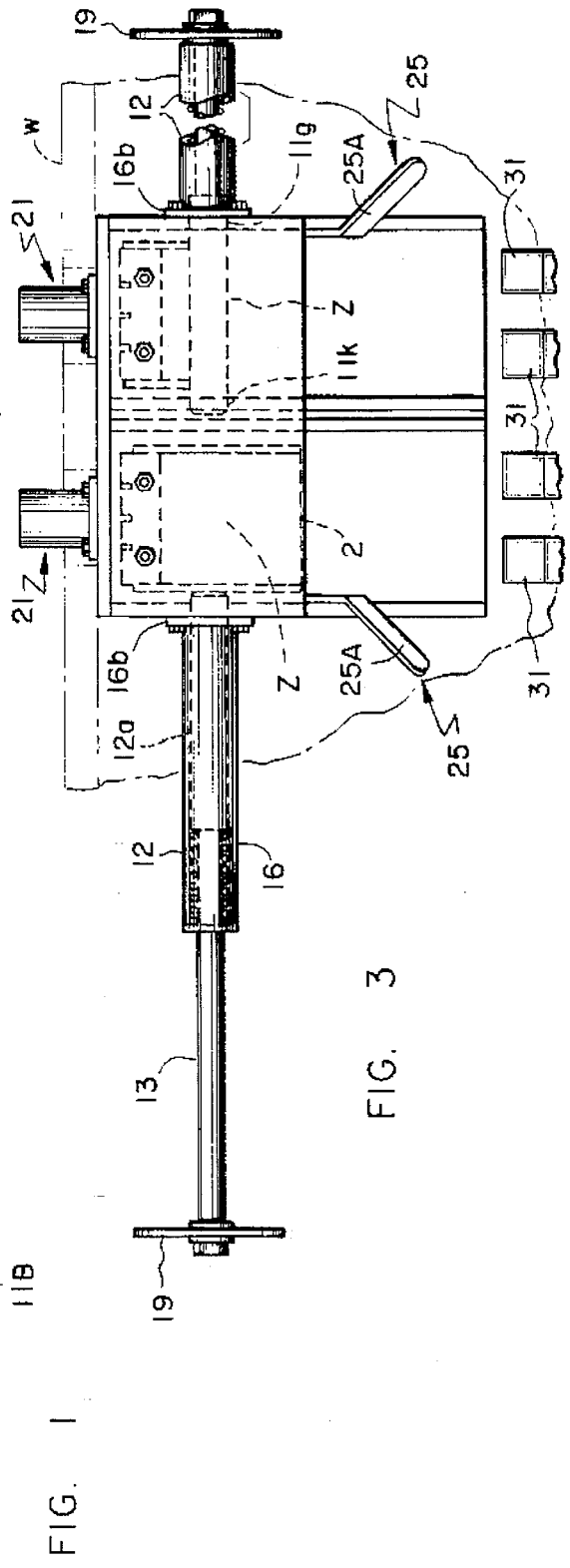

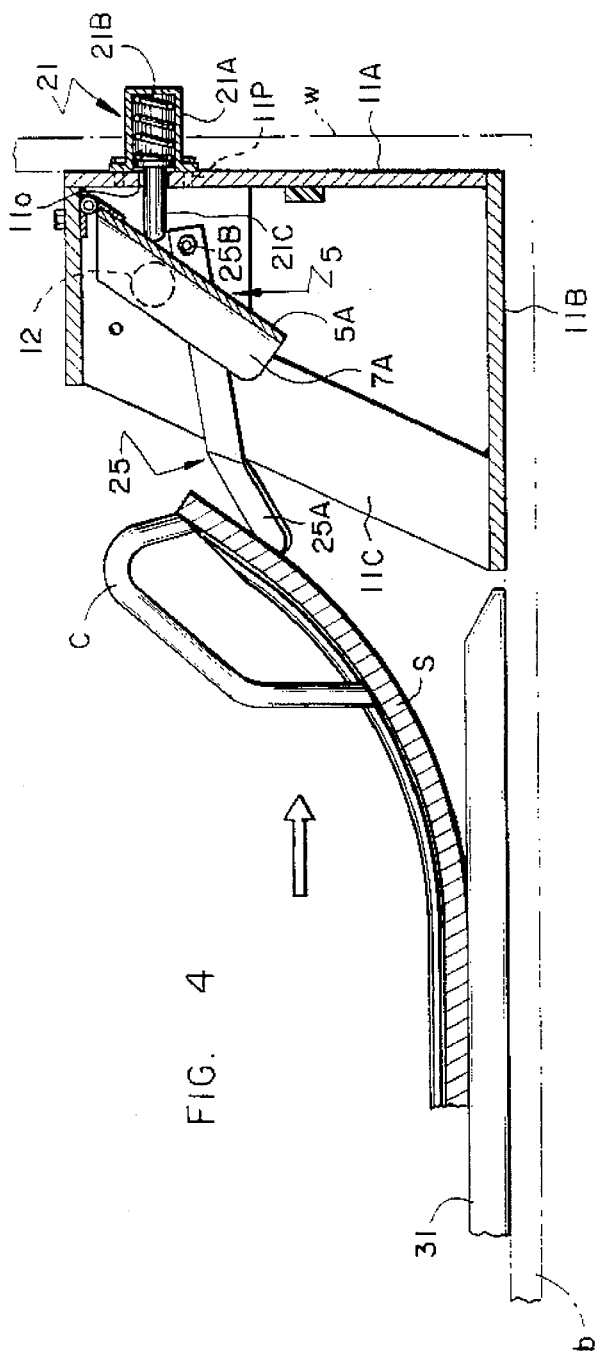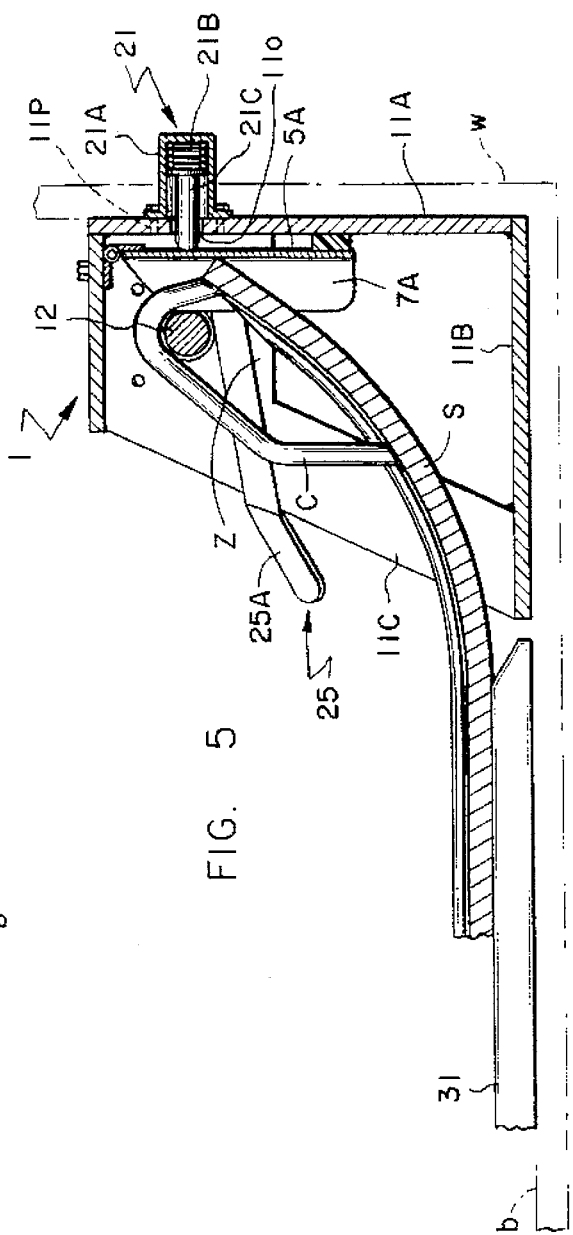

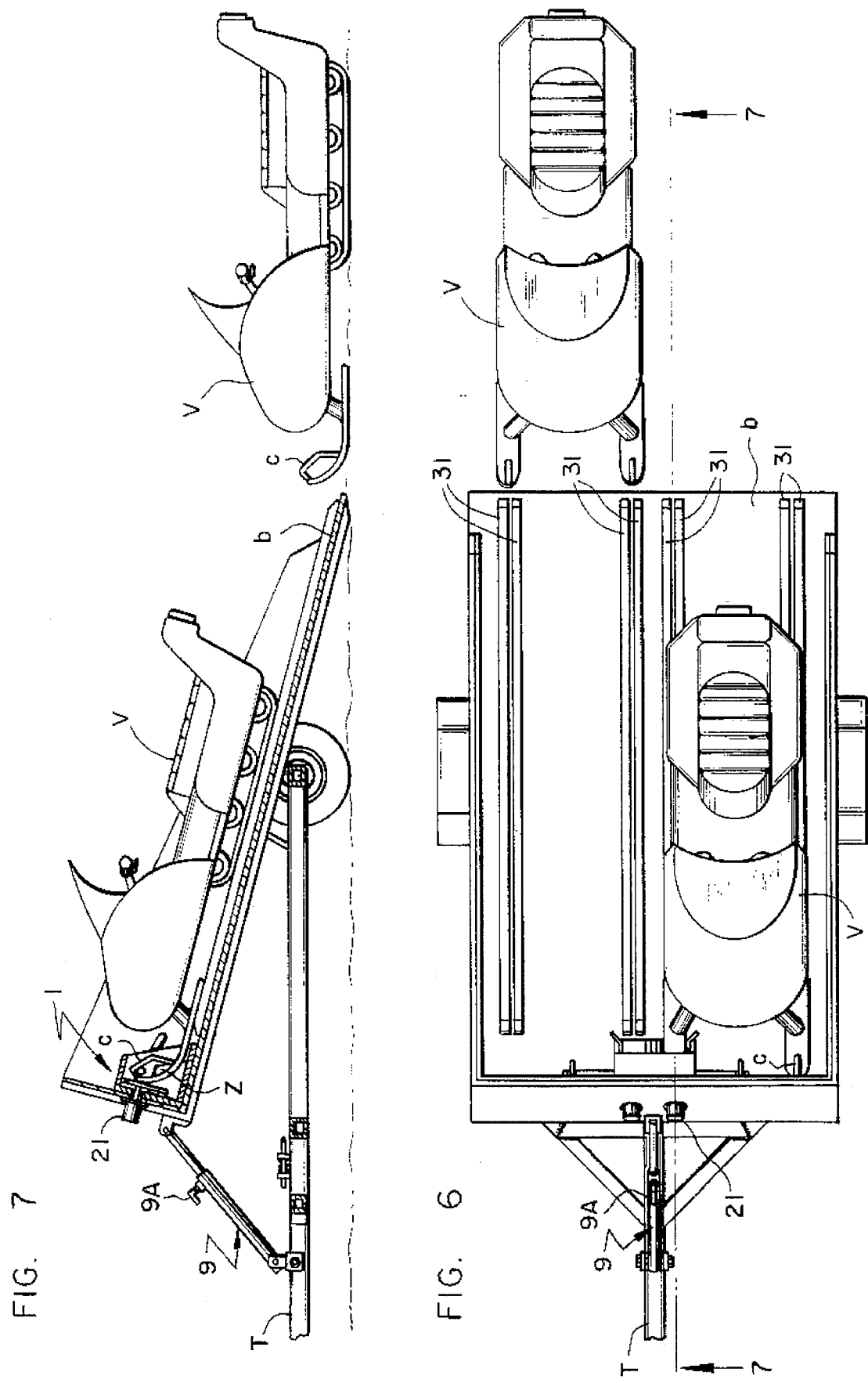

METHOD OF USING A COUPLING SYSTEM FOR MOTORIZED VEHICLES

This application is a Divisional Application of U.S. Patent application Ser. No. 08/079,460, filed Jun. 18, 1993, issued as U.S. Pat. No. 5,387,070 on Feb. 7, 1995, and entitled COUPLING SYSTEM FOR MOTORIZED VEHICLES.

FIELD OF THE INVENTION

The present invention relates to a coupling device and its use and more particularly a device for coupling and securing a motored vehicle onto a vehicular transport and the method for using the same.

BACKGROUND OF THE INVENTION

It is conventional to transport to a work or recreational site motored vehicles such as all terrain vehicles, garden tractors and mowers, golf carts, snowmobiles, etc., upon a vehicular transport such as trucks fitted with beds, trailers, carriages, and the like. The current practice is typified by the transporting of snowmobiles upon trailers to and from a snowmobiling recreational site. Although the transport of snowmobiles has been popular for several decades, little, if any, advances have been made in the manner snowmobiles are loaded and secured onto the transporting vehicle.

The most common procedure for loading a snowmobile onto a transporting trailer involves driving the snowmobile onto the trailer, stopping the snowmobile and then latching or securing a snowmobile onto the transport. Transporting trailers are often equipped with ramps which permit the snowmobile to be ramped onto the trailer bed without inclining or declining the bed. Frequently, the trailer beds are pivotally mounted so that the bed serves as a ramp. The pivotally mounted trailers are typically weighted so as to remain at an inclined ramping position until counter-balanced by the snowmobile weight which pivotally returns the bed to a horizontal position. With trailers equipped to haul two or more snowmobiles, the bed must be placed onto a horizontal position after each snowmobile loading in order to secure the snowmobile thereto, with this sequence being necessarily repeated for each snowmobile which is loaded onto the trailer. Irrespective of whether the trailer bed is inclined or ramped for loading the snowmobile thereupon, the snowmobile and bed are thus typically placed or returned to a horizontal position in order to secure the snowmobile thereto.

Serious injury and damage to persons and property have arisen in accidents occurring during the loading and unloading of snowmobiles onto trailers or other transporting vehicles. Snowmobiles have overshot the loading bed causing serious injury and damage to both the person and property. Injury and damage often arises by sliding backwards or sideways off an icy or slippery trailer which tends to arise after the power has been reduced or stopped during the loading operation. Such injury and damage could be substantially curtailed if it were possible to latch and immobilize the snowmobile while the snowmobile remains under motorized power.

SUMMARY OF THE INVENTION

The present invention provides a device for safely immobilizing and securing a moving mobile unit (e.g. such as a snowmobile) onto a vehicular transport such as a trailer. The device, when properly anchored, may be appropriately used for coupling and immobilizing a motored vehicle (equipped with a coupling unit or as frequently referred to as a "catch") onto a vehicular transport. The coupling and immobilizing device, in general, comprises:

a) means for positionally anchoring the device onto the vehicular transport within a coupling zone;

b) means for detecting an entry of the motored vehicle within the coupling zone; and c) means for releasing and coupling a coupling member onto the coupling unit in response to the entry of the motored vehicle onto said coupling zone, and thereby immobilizing the motored vehicle within said coupling zone.

The device may appropriately include a latching mechanism activated by impacting of the motored vehicle (e.g. such as a snowmobile) upon a detecting unit. The detecting unit may be a pivotally mounted plate which in the case of snowmobiles serves a means for detecting the entry of a snowmobile ski tip within the coupling or latching zone. Impacting of the ski tip upon the impacting plate initiates sufficient pivotal movement of retaining plate to release a coupling plunger retained thereby.

The device is securely mounted or anchored onto the vehicular transport at a position such that the impacting of the moving snowmobile ski tip upon the detecting unit causes the plunger retaining plate to release the coupling plunger which, in turn, latches onto a coupling unit or catch, such as an eyelet, securely affixed onto the moving snowmobile ski tip. The eyelet in combination with the plunger securely immobilizes the snowmobile onto the anchored device.

The present device provides a safe method for latching and securing a moving snowmobile onto a vehicular transport. The device may be used by simply ramping the trailer to an appropriate inclined position so as to permit one or more snowmobiles to be driven onto the vehicular transport in such a manner so that the ski tip impacts upon an impacting plate which triggers the release of a latching pin which latches onto the eyelet catch of the ski and thereby instantly immobilizes the snowmobile from any further movement thereupon. Once the snowmobile is immobilized by the latching pin, the operator of the snowmobile stops the motor of the latched snowmobile. The latched snowmobile may, thus, be immobilized against any backward movement upon the ramped trailer. If the snowmobile trailer is equipped for the ramping and loading of two or more snowmobiles thereupon, there is, accordingly, no need during the loading operation to unramp and reramp the trailer since the device securely latches and immobilizes each snowmobile impacting and caught by the device while the vehicular bed remains in the ramping or inclined position.

BRIEF DESCRIPTION OF THE DRAWINGS

FIG. 1 is a side view of the coupling and immobilizing device of this invention attached to a front wall portion and a bed portion of a vehicular transport.

FIG. 2 is a frontal view of the device shown in FIG. 1.

FIG. 3 is a top view of the device shown in FIG. 1.

FIG. 4 is a cross-sectional view taken along line 4—4 of FIG. 2 and shows a snowmobile ski tip approaching the coupling and immobilizing device of FIG. 1.

FIG. 5 is a cross-sectional view depicting an eyelet of a snowmobile tip coupled and immobilized by the device of FIG. 1.

FIG. 6 is a top view of a snowmobile trailer equipped with the coupling and latching device of FIG. 1.

FIG. 7 is a cross-sectional view taken along line 7—7 of FIG. 6.

DETAILED DESCRIPTION OF THE DRAWINGS

Figure 8:
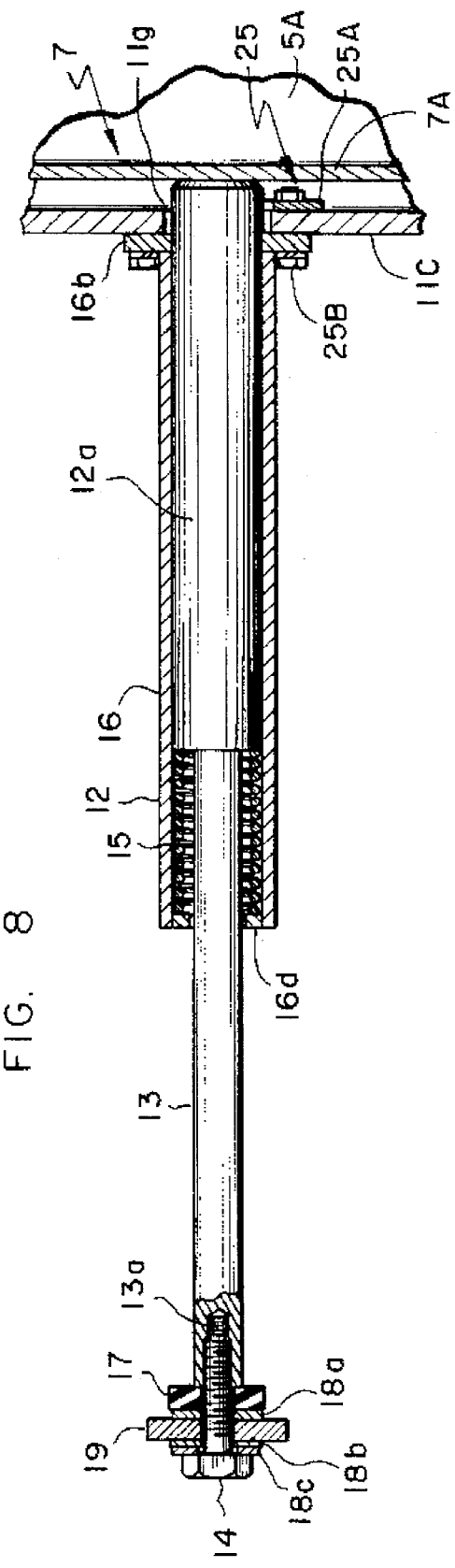
FIG. 8 is a partial cross-sectional view taken along line 8—8 of FIG. 1 which shows in greater detail an unlatched coupling member shown in FIG. 3.

With reference to the Figures, there is provided pursuant to the present invention a device (generally referenced as 1) for coupling or latching and immobilizing a motored vehicle V equipped with a catch or coupling unit C onto a vehicular transport (T) within a coupling or latching zone Z, said device 1 comprising:

a) means for positionally anchoring the device (generally enumerated as 3) onto the vehicular transport T within the coupling zone Z;

b) means for detecting (generally enumerated as 5) an entry of the motored vehicle V within the coupling zone Z;

c) means for releasing (generally referenced by 7) and a coupling member (generally referenced as 12) for coupling onto the catch C in response to the entry of the motored vehicle V within said coupling zone Z; and thereby immobilizing said motored vehicle V within said coupling zone Z with said device 1.

The device 1 catches and immobilizes a moving motored vehicle V (e.g. such as a snowmobile) as illustrated in FIGS. 5–7. The tips of most snowmobile skis S are equipped with an eyelet C (normally used for securing a tow) which effectively serves as the catch C or coupling unit C for coupling or latching a coupling plunger 12a onto the eyelets C of snowmobile ski S. The device 1 is most appropriately used in conjunction with a trailer T equipped with means for retaining (generally referenced as 9) the trailer bed (b) in an inclined ramping position while loading the snowmobiles V onto trailer T as depicted in FIG. 7.

The depicted device 1 includes a supportive frame 11 equipped with means for positionally anchoring (3) the device 1 onto an inner front sidewall (w) and bed (b) of transport T. The depicted frame 11 includes a rear frame section 11A and base frame section 11B equipped with means for bolting 3 the device so as to snuggly fit onto the angular juncture of front sidewall (w) and bed (b). Anchoring of supportive frame 11 onto front sidewall w and bed b provides a suitable coupling zone Z or zones Z for immobilizing one or more motored vehicles V onto a transport T.

The depicted trailer T of FIG. 6 is designed to transport two snowmobiles V in a side-by-side relationship, and shows a center mounting of device 1 upon front sidewall w so as to provide dual coupling zones Z for coupling two snowmobiles V onto the anchored device 1.

The depicted device 1 is suitably adapted for coupling two snowmobiles V onto snowmobile trailer T in a side by side relationship and comprises two coupling units of device 1, both of which are equipped with same working components. The dual units of device 1 are, in essence, a mirror image of one another with the depicted left sided unit 1 showing a snowmobile V already loaded and latched onto trailer T while the depicted right side unit 1 is shown as being in an activated position for latching and immobilizing a yet to be loaded snowmobile upon the right side of transport T. The depicted device 1, accordingly, includes dual coupling zones Z which are open for receiving and latching onto the ski eyelets C of snowmobile V as illustrated in FIGS. 5–9. The coupling zone Z depicted on the left hand side of FIGS. 2–4 is shown in an unlatched position and ready to receive and latch onto catch C. The left coupling zone Z is bordered by left outside angular plate 11C and left inside angular plate 11D which, in combination with base plate 11B and rear plate 11A, define an accessing opening for ski S to enter the left hand coupling zone Z. The right hand coupling zone Z, as depicted in FIGS. 2 and 3, is correspondly bordered by right outside angular plate 11E and right inside angular plate 11F with rear frame sections 11A and base frame 11B completing the accessing opening for receiving and immobilizing ski eyelets C of snowmobile within right coupling zone Z.

Figure 9:
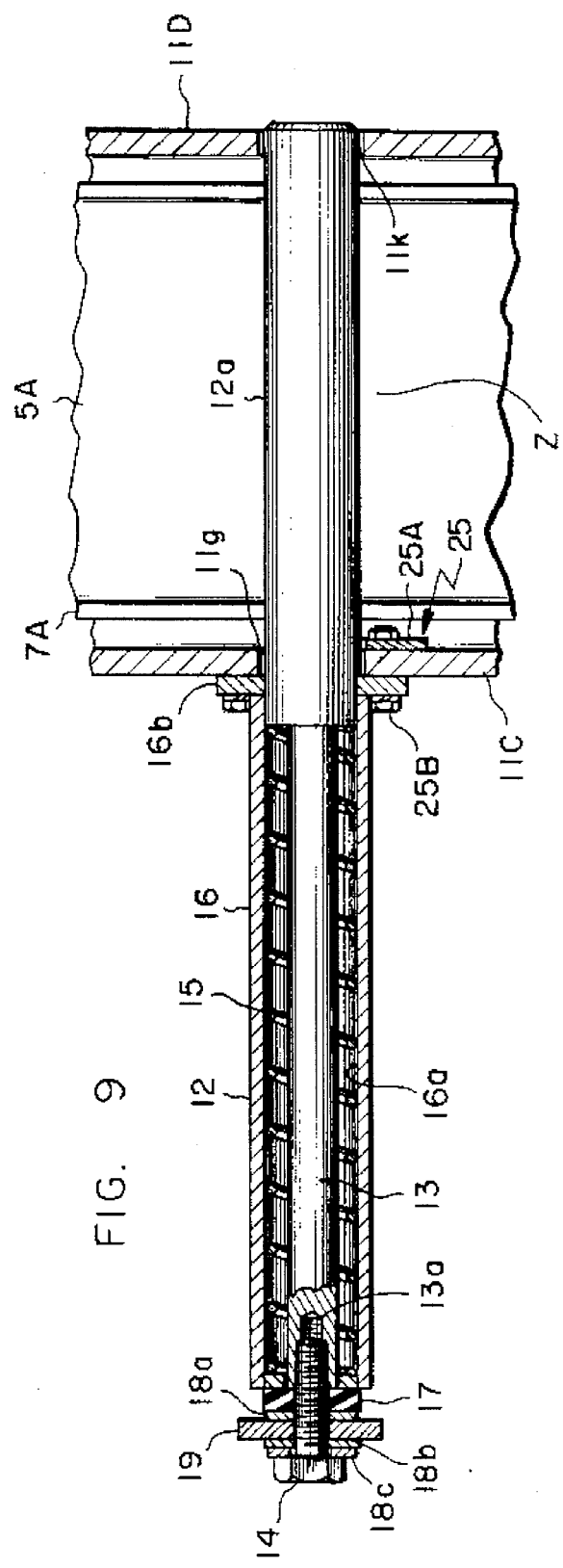
FIG. 9 is a cross-sectional view depicting the coupling member of FIG. 8 in a coupling position.
Figure 10:
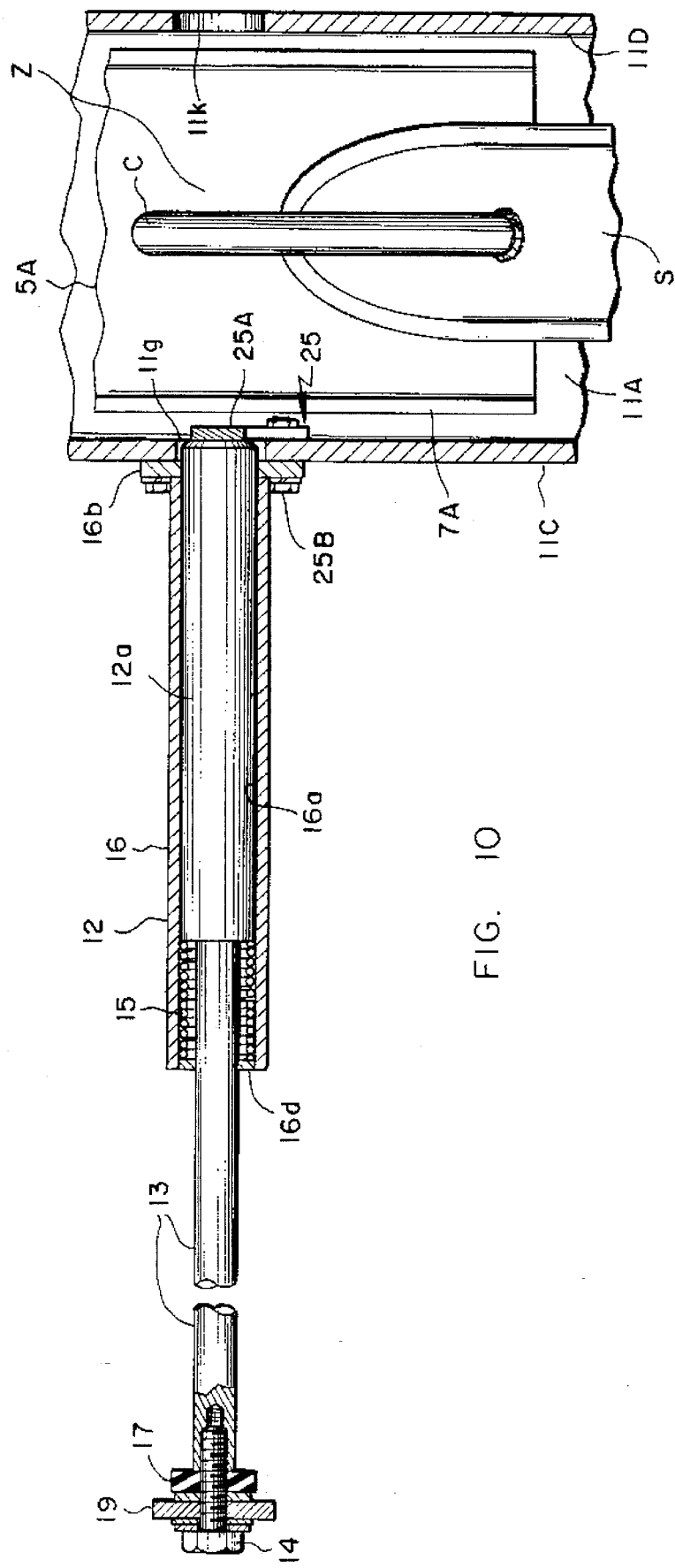
FIG. 10 is another cross-sectional view depicting employment of the restraining strap of the device shown in FIG. 1.

The depicted device 1 includes at least one coupling member (generally designated as 12) for coupling or latching onto the snowmobile ski eyelet C. The depicted coupling members 12 (two shown) respectively include a plunger head 12a fitted with a plunger rod 13 tapped with tap 13a to receive fastener (screw) 14. Biasing spring 15 circumscribes plunger rod 13 and normally biases the plunger head 12a to a latching position (as illustrated by the right device 1 depiction of FIGS. 2, 3 and 9) unless restrained from entry onto coupling zone Z or unlatching position as shown in FIGS. 2 and 3 or the left unit 1 latching position depiction of FIGS. 5 and 8 or when retained for unloading position as shown in FIG. 10. Plunger rod 13, spring 15 and plunger head 12a are reciprocally housed within the barrel chamber 16a of housing 16. Housing 16 includes at one end a mounting plate 16b for mounting the coupling members 12 onto outside angular plates 11C and 11E as depicted in FIGS. 2 and 3. As illustrated by the cross-sectional views (4 and 5; 8–10) of left mounted device 1, plunger head 12a is restrained in the withdrawn position about plunger apertures 11g (e.g. see FIGS. 8 and 10) when unlatched and bridges between plunger aperture 11g and latching aperture 11k when released to the latching position as illustrated by FIGS. 2, 3 and 9.

The opposite end of housing 16 includes a plunger stop 16d with an apertured bore sized to slideably receive rod 13 and stop plunger head 12a when plunger head 12a and compression spring 15 are withdrawn onto stop 16d. Rubber washer 17, washer 18a, handle 19, washer 18b and lock washer 18c are secured to tap 13a of plunger rod 13 with screw 14 so as to provide a handled plunger head 12a which may be more easily withdrawn from the coupling zone Z and set in the unlatched position as partially illustrated by FIGS. 2–4 and in 8–10.

In the latching position (as depicted in part by FIGS. 2, 3, 5, 7 and separately in FIG. 9), the plunger head 12a respectively bridges through and across the left outside angular plate 11C onto inside left angular plate 11D with plunger head 12a being firmly journalled within left outside plunger retaining aperture 11g and left inside plunger retaining aperture 11k. The right outside angular plate 11E and right inside angular plate 11F are similarly fitted with an outside plunger retaining aperture 11g and an inside plunger retaining aperture 11k for slideably receiving and retaining the corresponding plunger head 12a of the right unit device 1.

The depicted device 1 includes detecting means (generally designated as 5) for detecting an entry of the motored vehicle V within coupling zone Z as well as releasing means for releasing (generally designated as 7) and coupling the coupling member 12 onto the snowmobile ski eyelet C in mechanical response to detecting the entry of vehicle V to coupling zone Z. As illustrated in FIGS. 2–5 and 8, a pivotally mounted striker plate 5A fitted with flanged sidewalls 7A respectively serve to detect and release plunger head 12a to the latching or coupling position. When snowmobile ski S strikes striker plate 5A and pivotally moves the striker plate 5A sufficiently forward to cause flanged sidewalls 7A to clear outside plunger retaining aperture 11g so as to allow plunger head 12a to plunge through coupling zone Z and catch C onto plunger retaining aperture 11k and thereby firmly latch and immobilize a snowmobile ski eyelet C therewithin as illustrated by FIGS. 5, 7 and 9.

Each coupling device 1 of the illustrated combination includes a striker plate biasing assembly (generally referenced as 21) for applying a biasing force onto striker plate 5A to force flanged sidewalls 7A to block passage of the plunger head 12a in a restraining position as shown by the broken line 2 of FIG. 1 and by the cross-sectional view of FIG. 4 and also by FIGS. 2, 3 and 8. With particular reference to FIGS. 4 and 5, the rear plate 11A includes a striker plate plunger opening 11o and biasing assembly mounting apertures 11P for mounting striker plate biasing assembly 21 onto the back side of rear plate 11A. The striker biasing assembly 21 includes housing 21A which houses biasing spring 21B and ram 21C. Spring 21B biases ram 21C firmly against striker plate 5A and forced inwardly the flanged sidewalls 7A to retain plunger heads 12a in the unlatched or restrained position illustrated by the broken lines depiction of FIG. 1 and 4.

The cross-sectional view and broken lines of FIG. 4 depicts a ski S approaching the coupling zone Z with ram 21C being shown as biasing striker plate 5A outwardly sufficiently to allow flanged sidewalls 7A to restrain plunger head 12a in the unlatched position. When snowmobile ski S impacts against striker plate 5A with sufficient force to depress ram 21C into housing 21A, the pivotal movement of flanged sidewalls 7A provides sufficient clearance of the plunger head 12a therefrom to allow the plunger head 12a to be released therefrom with sufficient force and velocity to rapidly couple onto and immobilize the snowmobile eyelet C onto anchored device 1.

The cross-sectional view of FIG. 5 shows the pivotally mounted striker plate 5A depressed against rear frame 11A, biasing spring 22B fully compressed and ram 21C withdrawn within housing 21A and ski eyelet C cleared from restraining flange 7A which allows plunger head 12a to firmly secure eyelet C onto device 1. When it is desired to reset the coupling member 12 to a readied position for latching, coupling member 12 is withdrawn from the coupling zone Z sufficiently to allow the striker plate biasing assembly 21 to bias striker plate 5A and the restraining flange plate 7A to restrain plunger head 12a in an unlatched position as depicted by FIGS. 4 and 8.

FIGS. 8 and 9 respectively depict enlarged cross-sectional views of the left coupling member 12 in an unlatching position (non-coupling) for loading and in the latched or coupled position. In FIG. 8, retaining flange 7A retains plunger head 12a and compression spring 15 in a fully compressed and biasing state. Conversely, FIG. 9 depicts restraining flange plate 7A sufficiently removed from aperture 11g and plunger head 12a so as to provide clearance for plunger head 12a and thereby allow compression spring 15 to propel plunger head 12a through the latching zone Z and journal onto the apertured opening 11k of left inside frame 11D which secures and immobilizes ski eyelet C to device 1.

In order to unload the snowmobile V from transport T, there is a need for stopping means to temporarily restrain coupling member 12 in the unlatched position. An unloading plunger restraining stop (generally referenced by 25) serves as restraining stop to temporarily restrain the coupling member 12 in an unlatched position. Plunger restraining unit 25 holds plunger head 12a in the unlatched position and thereby facilitates the unloading of a previously latched snowmobile V from the transport T. As illustrated in greater detail in FIG. 5, the snowmobile ski S of a loaded snowmobile forces flanged retaining plate 7A from the latching zone Z so that plunger head 12a is released to the latching position. In the loaded position, the flanged retaining plate 7A cannot be effectively used to hold plunger head 12a from the latching zone Z. The unloading retaining unit 25, accordingly, temporarily serves to restrain plunger head 12a from latching zone Z so that the unlatched snowmobile V may then be effectively unloaded from transport T.

The unloading restraining unit 25 includes a pivotally mounted lever 25A which, when appropriately moved to a restraining position as illustrated in FIG. 10, restrains coupling member 12 (namely head 12a) and permits the temporarily unlatched snowmobile V to be unloaded from transport T. Restraining levers 25A may be pivotally mounted onto the inner walls of the outside angular frames (11C and 11E) by a bolt and nut fastener 25B or other suitable mounts as may be observed by reference to FIGS. 5 and 10. As illustrated in FIG. 10, restraining lever 25A may be positioned so as to rest substantially flush onto the inner wall of angular plate 11C (or 11E) so as to effectively restrain plunger head 12a from penetrating coupling zone Z. Restraining lever 25A and fastener 25B are also positioned sufficiently flush onto plate 11c so as to provide sufficient clearance to allow for impacting plate 5a and restraining flange 7A to move and pivot freely to a latching position and unlatching position.

A pair of ring washers (not shown) placed between frame 11C and lever 25A and the other washer between fastener nut 25B and lever 25A may be used to facilitate the pivotal movement of lever 25A about fastener bolt 25B. Tension upon the movement of lever 25A may be regulated by fastener 25B. Lever 25A is also appropriately configured so it obstructs passage of plunger head 12a through the latching zone Z when placed in the unloading restraining position (up) as illustrated in FIG. 10. Except for its use to restrain plunger head 12a in an unlatched position during unloading, lever 25A is normally positioned in the non-restraining position (shown as placed downwardly) as illustrated in the FIGS. 1–5 and 8. Thus, when "cocking" device 1 for snowmobile V impacting and coupling during loading (e.g. see FIG. 4) and while transporting the snowmobile V in a latched position as depicted in FIG. 5, lever 25A will be placed in the non-restraining position as depicted by FIGS. 1–9.

The bed (b) preferably includes a pair of polyethylene running guides 31 for each snowmobile ski S which serve as a guide for the snowmobile operator and runner for driving snowmobiles V onto trailer T. Illustratively, the polyethylene guides 31 may measure about 1.5 inches high and 1 inch wide and firmly secured or anchored onto trailer bed (b). The polyethylene guides 31 possess a sufficiently low co-efficient of friction to effectively reduce resistance when loading the snowmobile V onto bed (b). The snowmobile operator merely aligns a ski S onto the appropriate guide 31 and drives the snowmobile V onto impacting plate 5A which causes retaining plate 7A to release plunger head 12a and secure eyelet C onto the anchored device 1.

A major advantage of the coupling and immobilizing device 1 of this invention is illustrated by FIG. 7 which shows the pivotally mounted bed b positioned in an inclined or ramping position with one snowmobile V being already securely latched to the transport T while the second snowmobile V is ready for directly loading onto the ramped transport T. As may be observed (e.g. see FIGS. 6 and 7) the transporting trailer T includes means (generally referenced as 9) for maintaining the trailer bed b in an inclined position. The depicted transport T includes a telescoping brace 9 equipped with set bolt 9A which when secured in a bracing position as shown in FIG. 7 maintains the trailer bed b in ramped position for loading and for coupling both snowmobiles V onto transport T. Unlike conventional snowmobile loading systems which generally require the bed b to be placed at a horizontal position in order to secure each snowmobile V to bed b, the trailer bed b with the immobilizing device 1 of this invention may be maintained in a ramped or inclined position while loading and securing both snowmobiles to the latching device 1. The releasing and latching mechanism of the device 1 is quick, safe and reliable. The anchored device 1 will quickly stop and immobilize a moving snowmobile onto trailer T even while the snowmobile V remains under power. Once latched thereto, the snowmobile V remains immobilized against any backward movement upon the ramped bed b. The device 1 provides a quick and easy system for immobilizing one or more snowmobiles S to trailer T. Injury and damage to person and property can be substantially reduced by use of the device 1.

What is claimed:

1. A method for stopping and immobilizing a moving snowmobile by coupling a coupling unit affixed to the snowmobile with a snowmobile coupling device anchored to a snowmobile transport having a bed adjustable to an inclined ramping position for accessing the snowmobile onto the bed, said coupling device including a coupling zone for positioning and stopping the coupling unit at a coupling position, a releasable coupling means for the coupling with the coupling unit at the coupling position, and releasing means for releasing the coupling means upon the positioning of the coupling unit at the coupling position, said method comprising:

a) ramping the bed to the ramping position so as to permit access for the positioning and the stopping of the coupling unit of the snowmobile at the coupling position; and
   b) driving the coupling unit of the snowmobile into the coupling zone so as to provide for the positioning and the stopping of the coupling unit at the coupling position and the releasing of the coupling means by said releasing means so as to couple the coupling means and the coupling unit together;

and thereby provide for the stopping and the immobilizing of said moving snowmobile with said coupling device.

2. The method according to claim 1 wherein the snowmobile includes an eyelet affixed to a forward section of a snowmobile ski which serves as the coupling unit, and the bed is equipped to transport at least one snowmobile and to pivotally adjust to the ramping position, and the method includes, after said ramping step, coupling of the eyelet with the coupling means by the driving of the forward section of said snowmobile into the coupling zone so as to position and stop the eyelet at the coupling position and release the coupling means and thereby couple the releasable coupling means with the eyelet.

3. The method according to claim 2 wherein the coupling device includes a ski receiving housing defining the coupling zone for the positioning and the stopping of the eyelet at the coupling position by the stopping of the forward section of the ski with a ski stop which upon an impact of the forward section against the ski stop causes the releasing means to release the coupling means and couple with the eyelet at the coupling position and the method includes the impacting and the stopping of the forward section of the snowmobile ski with the ski stop so as to cause the releasing means to release and couple the coupling means with the eyelet at the coupling position.

4. The method according to claim 3 wherein the method provides for a sequentially coupling at a second coupling position of a second moving snowmobile having a second eyelet affixed to a second forward section of a second snowmobile ski with a second snowmobile coupling device anchored to said bed, said second coupling device including a second releasable coupling means for coupling with the second eyelet at the second coupling position, a second releasing means for subsequently releasing the second coupling means upon a positionally stopping of the second eyelet at the second coupling position, a second ski receiving housing defining a second coupling zone for the positionally stopping of the second eyelet at said second coupling position and the method includes the positionally stopping of the second eyelet of said second moving snowmobile at the second coupling position and the subsequently releasing of the second coupling means so as to couple the second coupling means with said second eyelet.

5. The method according to claim 3 wherein the bed additionally includes a second coupling device firmly anchored to the bed, with said second coupling device comprising a second coupling zone housed by said second coupling device, with said second coupling zone serving to positionally stop a second eyelet at a second coupling position, a second releasable coupling means for coupling with the second eyelet which is affixed to a second forward section of a second snowmobile ski carried by a second snowmobile, a second releasing means responsive to a striking of the second forward section against said second releasing means, and the method includes the striking of the second forward section against the second releasing means and the positional stopping of the second eyelet at the second coupling position so as to cause a release of the second coupling means and the coupling of the second coupling eyelet therewith.

6. The method according to claim 2 wherein the coupling zone includes a ski receiving housing for the positioning and the stopping of the eyelet at the coupling position and the releasing means retains the coupling means in an uncoupling position until activated to release the coupling means by a forceful striking of the snowmobile against the releasing means; said method including the striking of the snowmobile against the releasing means so as to cause the releasing means to release and couple the coupling means with the eyelet.

7. The method according to claim 3 wherein the device includes as the releasing means a pivotally mounted impacting plate which retains the releasable coupling means in an uncoupling position and upon a striking of the forward section of the snowmobile ski against the pivotally mounted impacting plate causes the impacting plate to pivot and positionally stop the eyelet at the coupling position and release the releasable coupling means at the coupling position, and wherein said impacting step includes the striking of the forward section against the pivotally mounted impacting plate so as to cause the impacting plate to pivotally move and stop the eyelet at the coupling position and release the coupling means and thereby couple the releasable coupling means with the eyelet.

8. The method according to claim 7 wherein the coupling means comprises a releasable coupling pin and the impacting plate is operationally connected to a retaining section serving to retain the coupling pin in the uncoupling position until activated by the striking of the forward section against the plate which striking causes the impacting plate and the retaining section to concurrently pivot and release the coupling pin at the coupling position; and the method includes retaining the coupling pin at the uncoupling position with the retaining section and thereafter the striking of the forward section against said impacting plate so as to positionally stop the eyelet at the coupling position and cause the retaining section to concurrently pivot and release the coupling pin at the coupling position.

9. The method according to claim 8 wherein the coupling pin comprises a spring actuated plunger for coupling with the eyelet, said plunger being retained at the uncoupling position by said retaining section and the plunger includes a spring for propelling the plunger to the coupling position upon the striking the forward section of the the snowmobile ski against the impacting plate so as to cause the retaining section to release the plunger, wherein the method includes additional steps of withdrawing the plunger from the coupling position and retaining the plunger in the uncoupled position with said retaining plate prior to the striking of said forward section against said impacting plate.

10. The method according to claim 2 wherein the bed includes multiple snowmobile coupling devices for coupling with multiple snowmobiles with each of said coupling devices housing separate coupling zones for separately stopping and immobilizing said multiple snowmobiles respectively within each of said coupling zones and the method includes individually driving and stopping one snowmobile of said multiple snowmobiles into one coupling zone of said coupling zones so as to couple the one snowmobile of said multiple snowmobiles thereto and thereafter sequentially driving and stopping another snowmobile of said multiple snowmobiles into another coupling zone of said coupling zones so as to thereby couple to another snowmobile of said multiple snowmobiles to the another coupling zone.

11. The method according to claim 10 wherein a snowmobile driver respectively drives and guides the one of the multiple snowmobiles and the another of the multiple snowmobiles onto multiple coupling zones by following running guides affixed to the bed which serve as guides for guiding the driver onto the coupling zones.

12. A method for stopping and immobilizing a moving snowmobile carrying an eyelet affixed to a forward ski section of a snowmobile ski with a coupling device firmly anchored upon a trailer bed of a snowmobile trailer, and coupling device comprising a forward ski section receiving housing equipped with a ski stop defining a coupling zone for positionally stopping the eyelet at a coupling position, a releasable coupling means for coupling with the eyelet at the coupling position and a releasing means for maintaining the coupling means in an uncoupling position and mechanically releasing the coupling means upon an impacting of the ski against the ski stop, said method comprising driving the eyelet into the coupling zone and the impacting of the ski against the ski stop so as to cause the releasing means to release the releasable coupling means and thereby couple the coupling means with the eyelet at the coupling position.

13. A method for stopping and immobilizing a snowmobile having an eyelet affixed to a forward section of a snowmobile ski by coupling the eyelet with a coupling device anchored to a snowmobile trailer having a bed with an access for driving the snowmobile onto the bed, said coupling device including a housing defining a coupling zone for receiving and positioning the eyelet at a coupling position by stopping the forward section of the snowmobile ski at the coupling position with a rear stop plate housed within the housing and a releasable coupler which upon the positioning of the eyelet at the coupling position couples together the eyelet and the coupler, said method comprising driving the forward section of the snowmobile ski into the housing and striking said forward section against the rear stop plate to stop the snowmobile ski and cause a release of the coupler at the coupling position, and thereby immobilizing said snowmobile upon the bed by coupling said coupler and the eyelet together.

14. The method according to claim 13 wherein the releasable coupler comprises a coupling pin retained in an uncoupled position by a coupling pin release which releases the coupling pin upon the impacting of the forward section against the stop plate and wherein said striking step includes the striking of the forward section against the stop plate so as to release the coupling pin at the coupling position and couple the coupling pin with said eyelet.

15. The method according to claim 14 wherein the coupling device includes an unloading restraining unit for mechanically restraining the coupling pin at the uncoupled position so as to permit an uncoupling of the eyelet and coupling pin and the method includes the uncoupling of the coupling pin and eyelet so as to uncouple the snowmobile from the coupling device, restraining the coupling pin at the uncoupled position with said unloading restraining unit and thereafter unloading the snowmobile from the bed.

16. The method according to claim 14 which includes a subsequent step of unloading the snowmobile by uncoupling the coupling pin and the eyelet, mechanically retaining the coupling pin in the uncoupled position with said coupling pin release, and thereafter removing the snowmobile from the bed.

17. The method according to claim 13 wherein the coupler comprises a coupling pin and the method includes coupling the coupling pin to the eyelet while the eyelet is positioned in the coupling position.

18. The method according to claim 13 wherein the coupling device includes an unloading restraining unit for mechanically restraining the coupler in an uncoupled position so as to permit an unloading of an uncoupled snowmobile from the bed and the method includes uncoupling the coupler from the eyelet, restraining the coupler in the uncoupled position with said unloading restraining unit and unloading the snowmobile from the bed.

\* \* \* \* \*